United States Patent
Honjo

(10) Patent No.: US 10,742,091 B2
(45) Date of Patent: Aug. 11, 2020

(54) COOLING STRUCTURE OF DRIVING DEVICE

(71) Applicant: HONDA MOTOR CO., LTD., Tokyo (JP)

(72) Inventor: Satoshi Honjo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/223,606

(22) Filed: Dec. 18, 2018

(65) Prior Publication Data
US 2019/0260272 A1    Aug. 22, 2019

(30) Foreign Application Priority Data

Feb. 21, 2018   (JP) ................. 2018-028806

(51) Int. Cl.
| | | |
|---|---|---|
| H02K 9/193 | (2006.01) | |
| H02K 5/20 | (2006.01) | |
| B60K 11/00 | (2006.01) | |

(52) U.S. Cl.
CPC ........... *H02K 9/193* (2013.01); *H02K 5/20* (2013.01); *B60K 11/00* (2013.01); *B60Y 2306/05* (2013.01); *B60Y 2400/60* (2013.01)

(58) Field of Classification Search
CPC .......... B60K 11/00; B60K 11/02; B60K 1/00; B60K 2001/001; B60K 2001/003; B60K 2001/006; B60Y 2306/05; B60Y 2400/60; B60Y 2306/03; B60Y 2400/61; H02K 5/20; H02K 9/193
USPC ......................................... 310/54
See application file for complete search history.

(56) References Cited

U.S. PATENT DOCUMENTS

| | | | |
|---|---|---|---|
| 2014/0041371 A1* | 2/2014 | Nakayama | F01N 3/046 60/321 |
| 2014/0190428 A1* | 7/2014 | Kikuchi | F16H 57/0413 123/41.55 |
| 2015/0133009 A1* | 5/2015 | Saruwatari | B63H 20/28 440/88 P |

(Continued)

FOREIGN PATENT DOCUMENTS

| | | |
|---|---|---|
| JP | 2004-194389 | 7/2004 |
| JP | 2010-060037 A | 3/2010 |
| WO | 2017/056837 A1 | 4/2017 |

OTHER PUBLICATIONS

Translation of foreign document WO 2017056837 A1 (Year: 2017).*

(Continued)

*Primary Examiner* — Alex W Mok
(74) *Attorney, Agent, or Firm* — Rankin, Hill & Clark LLP

(57) ABSTRACT

In order to improve cooling performance for lubricating oil without increasing the size of an oil pump or an oil cooler and achieve the improvement of the cooling performance with a highly durable configuration, a wheel driving device includes an electric motor provided in an electric motor case such that the lubricating oil retained in the electric motor case is made to circulate to lubricate and cool the electric motor and the electric motor is cooled by cooling water flowing in a cold water jacket provided in the electric motor case. The wheel driving device includes an oil passage in which the lubricating oil circulates. The oil passage is provided on an outer portion of the electric motor case along the cold water jacket.

3 Claims, 5 Drawing Sheets

(56) References Cited

U.S. PATENT DOCUMENTS

2015/0361839 A1* 12/2015 Kimura .................. F01M 5/002
  123/196 A

OTHER PUBLICATIONS

Translation of foreign document JP 2010060037 A (Year: 2010).*
Japanese Office Action dated Oct. 1, 2019, with English translation, 7 pages.

* cited by examiner

COOLING STRUCTURE OF DRIVING DEVICE

CROSS-REFERENCE TO RELATED APPLICATION

The present application claims priority under 35 U.S.C. § 119 to Japanese Patent Application No. 2018-028806 filed on Feb. 21, 2018, the entire contents of which are hereby incorporated by reference.

BACKGROUND OF THE INVENTION

Field of the Invention

The present disclosure relates to a cooling structure of a driving device.

Description of the Related Art

An electric motor for driving a vehicle experiences increase in an amount of heat generation as a result of increase in its output power. Improvement in cooling performance for the electric motor is a serious challenge that needs to be addressed in order to cope with the increase in the amount of heat generation. As a method for improving the cooling performance for the electric motor, a method may be adopted in which a water cooling jacket is provided in a case of the electric motor to cool the electric motor by cooling water.

Further, a method is known which supplies automatic transmission fluid (ATF) to the electric motor as lubricating oil to improve the cooling performance. This method adopts an approach which increases the size of the electric oil pump to increase the cooling performance.

Furthermore, as indicated in Japanese Patent Application Laid-Open No. 2004-194389, another known method increases the size of the oil cooler mounted to the case of the electric motor so as to improve the cooling performance for the electric motor.

However, if the sizes of the electric oil pump and the oil cooler become large, the size of the driving device itself to which they are amounted becomes large. As a result, the space that the driving device occupies in the vehicle in which the driving device is incorporated becomes large.

Further, if a large-size electric oil pump or oil cooler is used, the amount of the lubricating oil in use will be increased. As a result, components such as an oil filter associated with the lubricating oil will also become large in size or need to have a high performance. Further, the costs at the time of oil changes will increase as well.

Moreover, in a large-sized oil cooler, when the contact path between the cooling water and the lubricating oil becomes long, the sealing member between the cooling water and the lubricating oil becomes large in size or the number of the sealing members need to be increased. In addition, since the components constituting the oil cooler become large, countermeasures need to be taken considering thermal distortion of the components.

SUMMARY OF THE INVENTION

In view of the above-described traditional drawbacks, an object of the present disclosure is to improve cooling performance for lubricating oil without increase in the size of an oil pump or an oil cooler and achieve the improvement of the cooling performance with a simple and highly durable configuration.

A cooling structure of a driving device according to an embodiment of the present disclosure includes an electric motor in an electric motor case. Lubricating oil retained in the electric motor case is made to circulate to lubricate and cool the electric motor. The electric motor is cooled by cooling water flowing in a cold water jacket provided in the electric motor case. The cooling structure includes an oil passage in which the lubricating oil circulates. The oil passage is provided in an outer portion of the electric motor case and extends along the cold water jacket.

In addition, according to the embodiment of the present disclosure, the oil passage may be provided between an oil pump mounted to the outer surface of the electric motor case and the cold water jacket.

In addition, the oil passage may be connected to the discharge side of the oil pump.

According to the cooling structure of the driving device of the embodiment of the present disclosure, it is made possible to implement efficient cooling of the lubricating oil without increase in the size of the cooler or the oil pump. In addition, since the cooling performance for the lubricating oil can be improved by virtue of the configuration of the passage of the lubricating oil, it is made possible to perform efficient manufacturing and reduce the costs associated with the improvement of the cooling performance.

Further, when the configuration is defined such that the oil passage is to be provided between the oil pump mounted to the outer surface of the electric motor case and the cold water jacket, the space between the oil pump and the cold water jacket can be utilized. As a result, the cooling performance for the lubricating oil can be improved while the size of the driving device remains the same.

Furthermore, when the configuration is defined such that the oil passage is to be connected to the discharge side of the oil pump, the heat of the lubricating oil whose temperature has risen due to the pressure by the oil pump can be efficiently transferred to the cold water jacket and the cooling performance for the lubricating oil can be improved.

DETAILED DESCRIPTION OF THE PREFERRED EMBODIMENTS

The embodiments of the present disclosure will be described hereinbelow with reference to the drawings.

A driving device 1 according to an embodiment of the present disclosure will be described with reference to FIGS. 1 to 3.

Figure 1:
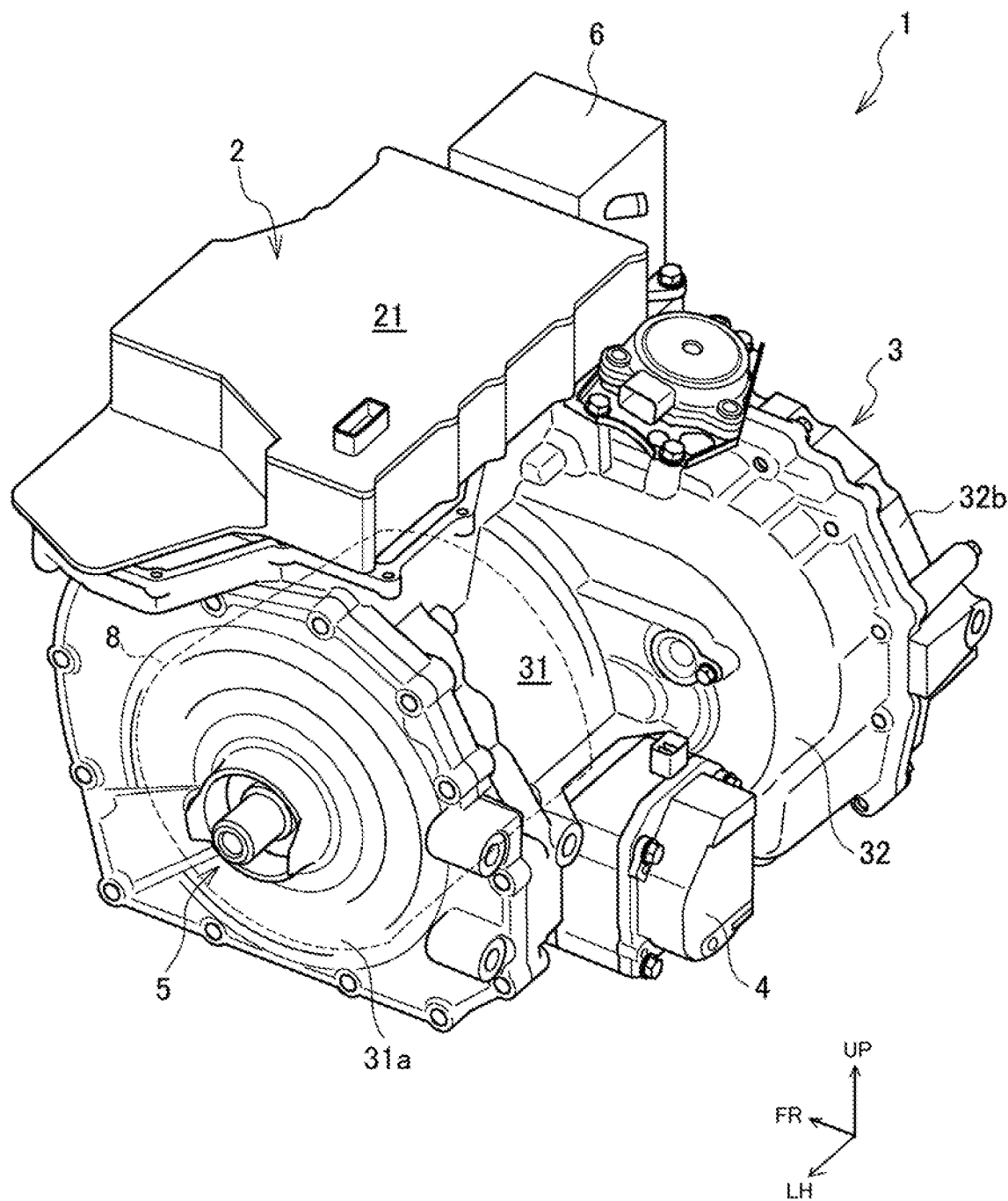
FIG. 1 is a perspective view illustrating a driving device according to an embodiment of the present disclosure.
Figure 2:
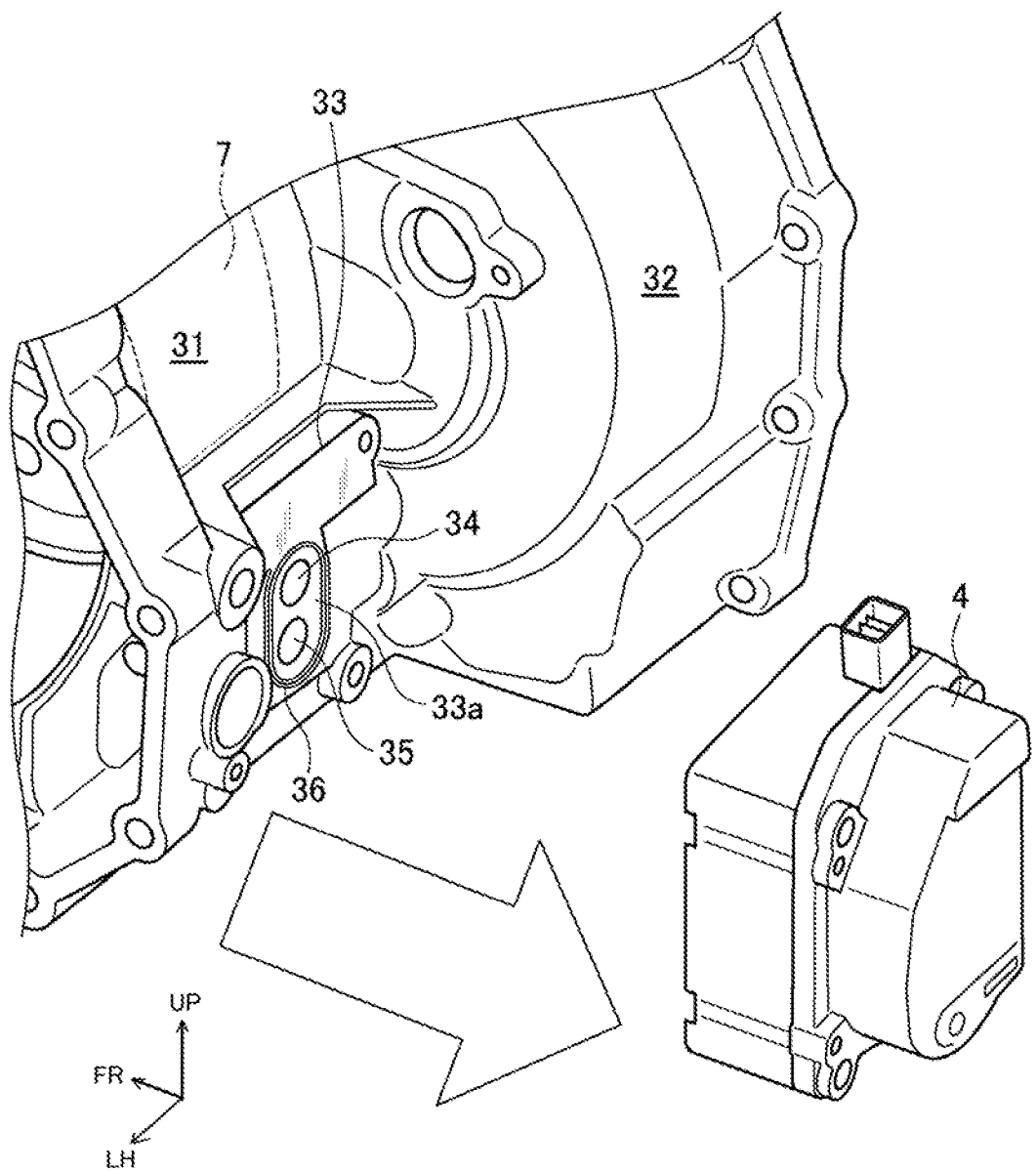
FIG. 2 is a perspective view illustrating a mounting structure of an electric oil pump.
Figure 3:
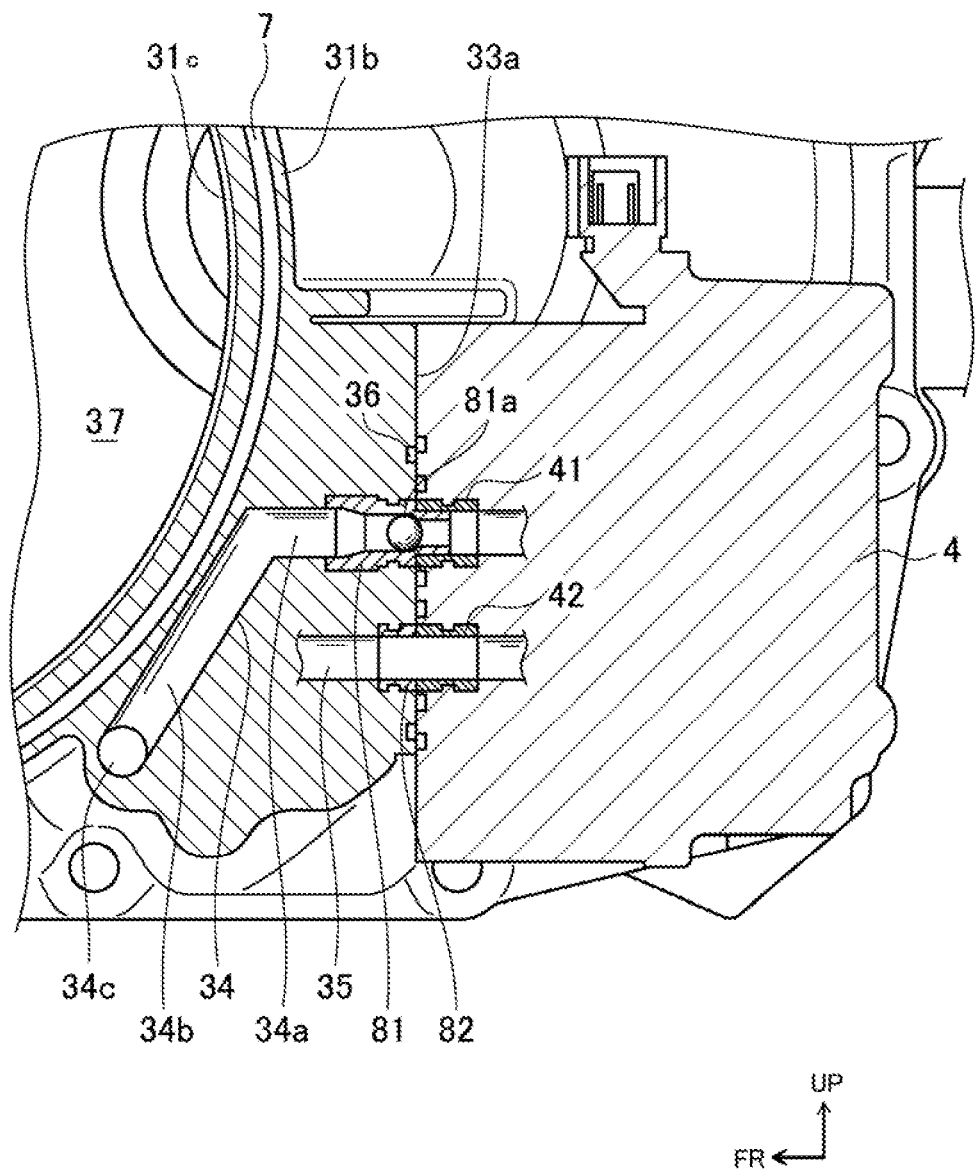
FIG. 3 is a cross-sectional view illustrating an oil passage structure according to the embodiment of the present disclosure.

FIG. 1 is a perspective view illustrating the driving device 1 according to the embodiment of the present disclosure, FIG. 2 is a perspective view illustrating a mounting structure of an electric oil pump, and FIG. 3 is a cross-sectional view illustrating an oil passage structure according to the embodiment of the present disclosure. Note that, in these figures, FR, UP, and LH indicate a frontward direction, an upward direction, and a leftward direction, respectively.

The driving device 1 includes an inverter unit 2, a decelerator unit 3, an electric oil pump 4, and an oil cooler 6. In the driving device 1, the inverter unit 2 supplies electric driving power to the decelerator unit 3 so as to drive an electric motor 8 in the decelerator unit 3. A not-shown deceleration mechanism is provided in the decelerator unit 3 and the driving force of the electric motor 8 decelerated by the deceleration mechanism is output by an output shaft 5.

In the inverter unit 2, a not-shown power unit is arranged in an inverter unit case 21. The inverter unit case 21 is mounted to an electric motor case 31 and a decelerator case 32 at an upper portion of the decelerator unit 3.

In addition, the electric motor 8 is arranged in the electric motor case 31, where the electric motor 8 is covered by an electric motor case 31 and a cover 31a. On the other hand, the deceleration mechanism of the decelerator unit 3 is arranged in a decelerator case 32 and covered by a decelerator case 32 and a cover 32a.

The electric motor case 31 has a cylindrical shape whose cylinder portion is extended outward in alignment with the orientation in which the output shaft 5 projecting from the cover 31a extends. In addition, the driving shaft of the electric motor 8 in the electric motor case 31 is made of a hollow shaft and the output shaft 5 extends through the driving shaft of the electric motor 8 and connected to the deceleration mechanism in the decelerator case 32. As a result, the rotation axis of the electric motor 8 coincides with the rotation axis of the output shaft 5. In other words, the electric motor 8 and the output shaft 5 have a rotation axis extending in a right-left direction.

The electric motor case 31 is connected to the front side of the decelerator case 32 and has a configuration in which the rear end portion of the decelerator case 32 is projected more rearward than the rear end portion of the electric motor case 31. Further, the electric oil pump 4 is mounted to the electric motor case 31. As a result, the rear end portion of the electric oil pump 4 and the rear end portion of the decelerator case 32 generally coincide with each other in their side views, which leads to a compact configuration of the driving device.

In addition, the electric motor case 31 and the decelerator case 32 are configured in one piece with each other so that the lubricating oil can flow between the electric motor case 31 and the decelerator case 32. The cover 31a is attached to one side of the electric motor case 31 while the decelerator case 32 is connected to the opposite side of the electric motor case 31. In addition, the cover 32b is attached to the decelerator case 32 and the lubricating oil is retained in the electric motor case 31 and the decelerator case 32.

It should be noted that ATF may be used as the lubricating oil in this embodiment and antifreeze liquid may be used as the cooling water.

The cooling structure of the driving device 1 will now be described.

The driving device 1 is configured to be cooled by cooling water.

The driving device 1 is connected to a not-shown water-cooling system. The inverter unit 2 and the electric motor case 31 are cooled by the cooling water. The cooling water pump of the water-cooling system is connected to the inverter unit 2. The cooling water is supplied to the inside of the inverter unit case 21. In addition, the cooling water is supplied to the inside of the electric motor case 31 via the inside of the inverter unit case 21. As a result, the power unit of the inverter unit 2 and the electric motor 8 inside the electric motor case 31 are cooled. In addition, the cooling water that has cooled the lubricating oil by the oil cooler 6 is introduced again into the cooling water pump via a not-shown radiator and circulates in this manner.

Besides, in the electric motor case 31, a cold water jacket 7 is provided so as to cover the electric motor 8. The electric motor 8 is to be cooled by the cold water jacket 7 having a shape of a ring and covering the electric motor 8. The cold water jacket 7, which is provided inside the electric motor case 31, has a cylindrical shape extending the right-left direction to conform to the shape of the electric motor case 31.

The cold water jacket 7 includes a passage of the cooling water provided in the electric motor case 31 in its thickness direction. As illustrated in FIG. 3, the cold water jacket 7 is provided between the inner peripheral surface 31c of a motor chamber 37 provided in the electric motor case 31 and the outer peripheral surface 31b of the electric motor case 31.

In addition, when the lubricating oil is supplied to the inside of the motor chamber 37, the heat of the electric motor 8 is transferred via the lubricating oil to the inner peripheral surface 31c and the heat of the electric motor 8 is efficiently transferred to the cold water jacket 7.

By virtue of this, the heat generated in the electric motor 8 is passed to the cold water jacket 7 surrounding the electric motor 8 and thus the electric motor 8 is cooled.

In the driving device 1, the lubricating oil that has been cooled by the oil cooler 6 is supplied to the electric motor 8 of the electric motor case 31 and the decelerator in the decelerator case 32. As a result, the electric motor 8 and the deceleration mechanism are lubricated, the heat of the electric motor 8 is transferred via the lubricating oil to the cold water jacket 7, and thus the electric motor 8 is cooled. A certain amount of lubricating oil is retained inside the electric motor case 31, and the electric motor 8 is placed in a state where it is partly immersed in the lubricating oil. As a result, a certain amount of lubricating oil is retained inside the cold water jacket 7 to be cooled.

The lubricating oil stored at the lower portions of the electric motor case 31 and the decelerator case 32 is supplied to the upper portions of the electric motor case 31 and the decelerator case 32 by the electric oil pump 4. As a result, the lubricating oil is supplied to the oil cooler 6, the electric motor case 31, and the decelerator case 32 to circulate.

As illustrated in FIG. 2 and FIG. 3, the electric oil pump 4 is removably attached to the outer surface of the electric motor case 31. A mounting section 33 is provided at the outer periphery of the rear portion of the electric motor case 31. The electric oil pump 4 is attached to the mounting section 33. Specifically, the electric oil pump 4 is mounted to the rear surface of the lower portion of the electric motor case 31 on the side of the decelerator case 32.

The mounting section 33 is provided in one piece with the electric motor case 31 and is provided by increasing the thickness of the electric motor case 31 on the side of the outer peripheral surface 31b.

A mounting surface 33a is provided in the mounting section 33. The mounting surface 33a is configured to have a flat shape. The electric oil pump 4 is mounted to the mounting surface 33a.

Further, the mounting section 33 is provided at the lower portion of the electric motor case 31. The lubricating oil path to the electric oil pump 4 is made shorter than the electric motor case 31 and the lower portion of the decelerator case 32. In addition, it has a shape that facilitates introduction of the lubricating oil to the electric oil pump 4.

An oil passage 34 on the lubricating oil introduction side and an oil passage 35 on the discharge side open in the mounting surface 33a, where they are juxtaposed in an up-down direction. In addition, the oil passage 34 and the oil passage 35 are connected to the port 41 and the port 42, respectively, of the electric oil pump 4.

The port 41 of the electric oil pump 4 is connected to a connector 81 provided in the oil passage 34. A check valve 81a is provided in the connector 81. As a result, discharge of oil from the oil passage 34 when the electric oil pump 4 is removed is prevented, which makes it possible to perform maintenance and replacement of the electric oil pump 4. Further, a connector 82 is provided in the oil passage 35, to which the port 42 of the electric oil pump 4 is connected.

In addition, a groove 36 surrounding the oil passages 34 and 35 is provided in the mounting surface 33a. A not-shown sealing member is attached to the groove 36. As a result, leakage of the lubricating oil in the mounting surface 33a is prevented.

The oil passage 34 provided in the mounting section 33 has an oil passage 34a, an oil passage 34b, and an oil passage 34c. The oil passage 34a is an oil passage that extends from the mounting surface 33a in a direction in which the oil passage becomes close to the cold water jacket 7. The oil passage 34b and the oil passage 34c are oil passages extending along the cold water jacket 7.

The oil passage 34a extends in a direction perpendicular to the mounting surface 33a and in a linear fashion from the mounting surface 33a toward the cold water jacket 7. In addition, the oil passage 34a is connected to the oil passage 34b in the vicinity of the cold water jacket 7 provided inside the electric motor case 31.

The oil passage 34b is an oil passage extending in a linear fashion along the cold water jacket 7 in its circumferential direction. Further, the oil passage 34b extends in a direction orthogonal to the direction of the axis of the cylindrical shape of the electric motor case 31. Specifically, the oil passage 34b extends in the mounting section 33 in the vicinity of the cold water jacket 7 obliquely forward and downward. It may be noted that the oil passage 34b is provided within the range of the distance that is sufficient for transfer of the heat of the lubricating oil to the cold water jacket 7.

Since the oil passage 34b is extended downward on the outer side of the cold water jacket 7, the lower portion of the electric motor case 31 is allowed to be utilized. By virtue of this, it is made possible to utilize the section where the distance is large between the electric oil pump 4 and the cold water jacket 7, which increases the degree of freedom of the layout of the oil passage 34b. Further, the degree of freedom of arrangement of the oil passage 34c to be connected to the oil passage 34b will be increased.

In addition, the oil passage 34c extends in the vicinity of the cold water jacket 7 in parallel with the direction of the axis of the cylindrical shape of the electric motor case 31. By virtue of this, it is made possible to provide the oil passage 34c in the vicinity of the cold water jacket 7 and transfer the heat of the lubricating oil passing through the oil passage 34c to the cooling water inside the cold water jacket 7.

As a result, the oil passage 34 has an oil passage 34b extending along the cold water jacket 7 in its circumferential direction and an oil passage 34c along the cold water jacket 7 in its cylinder axis direction. By virtue of this, the heat of the lubricating oil passing through the oil passage 34 can be transferred to the cold water jacket 7 and thus the lubricating oil can be efficiently cooled.

Note here that the lubricating oil discharged by the electric oil pump 4 is pressurized at the time of the pumping and its temperature rises slightly. As a result, the oil passage 34 is connected to the discharge-side port 41 and thereby the heat of the lubricating oil whose temperature has risen can be efficiently transferred to the cold water jacket 7.

The operation of the embodiment of the present disclosure will now be described.

The lubricating oil supplied to the electric motor case 31 and the decelerator case 32 lubricates and cools the electric motor 8 and lubricates the deceleration mechanism. After that, the lubricating oil is stored in the lower portions of the electric motor case 31 and the decelerator case 32.

The stored lubricating oil is then introduced from the oil passage provided in the electric motor case 31 and the decelerator case 32, via the oil passage 35 of the mounting section 33, into the electric oil pump 4. The electric oil pump 4 discharges the introduced lubricating oil to the oil passage 34. At this point, the temperature of the lubricating oil slightly rises due to pressurization of the lubricating oil and transfer of heat generated in the electric oil pump 4 itself.

The lubricating oil that has been discharged by the electric oil pump 4 to the oil passage 34 flows via the oil passage 34a into the oil passage 34b and oil passage 34c which extend in the vicinity of the cold water jacket 7. By virtue of this, the heat of the lubricating oil is transferred to the cold water jacket 7 and the lubricating oil is cooled.

After that, the lubricating oil is pumped to the oil cooler 6 and further cooled by the cooling water introduced into the oil cooler 6. In addition, the lubricating oil circulates inside the electric motor case 31 and the decelerator case 32 under the operation of the electric oil pump 4.

As has been described above, the oil passage 34 is provided in the outer portion of the electric motor case 31 such that it conforms to the shape of the cold water jacket 7, and the lubricating oil can be cooled on the path in which the lubricating oil returns to the oil cooler 6.

Specifically, the lubricating oil can be cooled by virtue of the configuration of the oil passage 34 which is provided in the electric motor case 31 and the cooling performance for the lubricating oil can be improved by virtue of the structure of the electric motor case 31.

Further, since the oil passage is provided on the outer side of the cold water jacket 7, the amount of the lubricating oil cooled by the cold water jacket 7 can be increased and thus the cooling efficiency can be improved without changing the inner configuration of the cold water jacket 7.

Since the oil passage 34 in the vicinity of the cold water jacket 7 is provided in the mounting section 33 of the electric oil pump 4 of the electric motor case 31, creation of the oil passage 34 can be readily performed. In addition, it is made possible to reduce the cost that may be incurred in creation of the oil passage 34.

Since the oil passage 34 is provided by utilizing the space between the electric motor case 31 and the electric oil pump 4, it is made possible to improve the cooling performance while the size of the driving device 1 remains the same.

Further, since the oil passage 34 is connected to the discharge-side port 41 of the electric oil pump 4, it is made possible to efficiently cool the lubricating oil whose temperature has risen due to the pressurization and heat generation by the electric oil pump 4. Since heat more readily moves when the temperature difference is larger, the heat of the lubricating oil whose temperature has risen can be transferred efficiently to the cold water jacket 7 and the cooling performance for the lubricating oil can be improved.

Since the oil passage 34 is provided inside the electric motor case 31 which is the same member constituting the cold water jacket 7, the heat conduction efficiency can also be improved. Further, since no sealing member is required between the cold water jacket 7 and the oil passage 34, it is made possible to improve the cooling performance for the lubricating oil by the highly durable and reliable configuration.

When aluminum alloy is used for the electric motor case 31, it is made possible to manufacture a lightweight driving device 1 with high cooling performance by utilizing the high thermal conductivity of the aluminum alloy.

A configuration of another oil passage according to an embodiment of the present disclosure will be described below with reference to FIG. 4 and FIG. 5.

Figure 4:
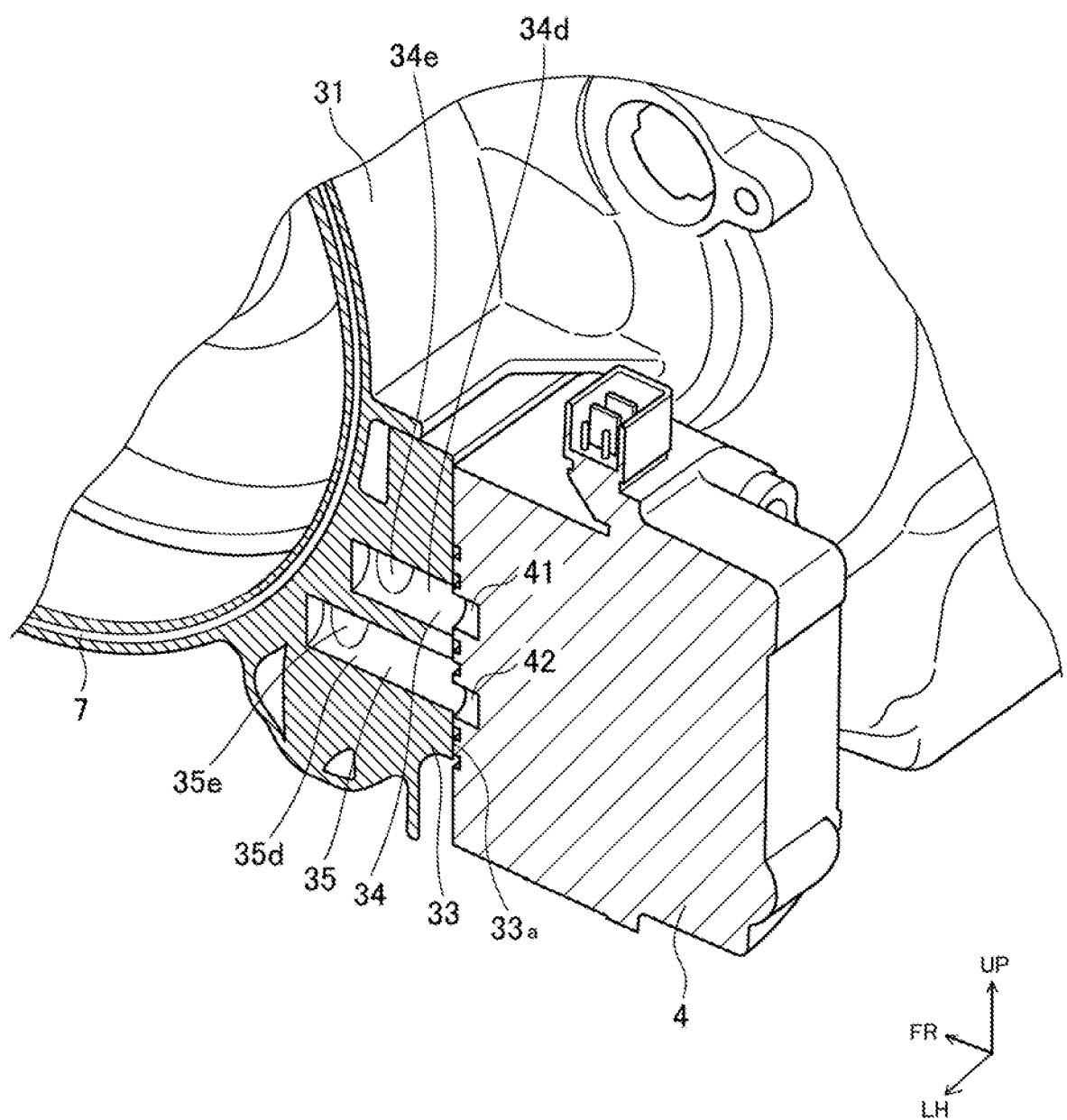
FIG. 4 is a perspective cross-sectional view illustrating another oil passage structure.
Figure 5:
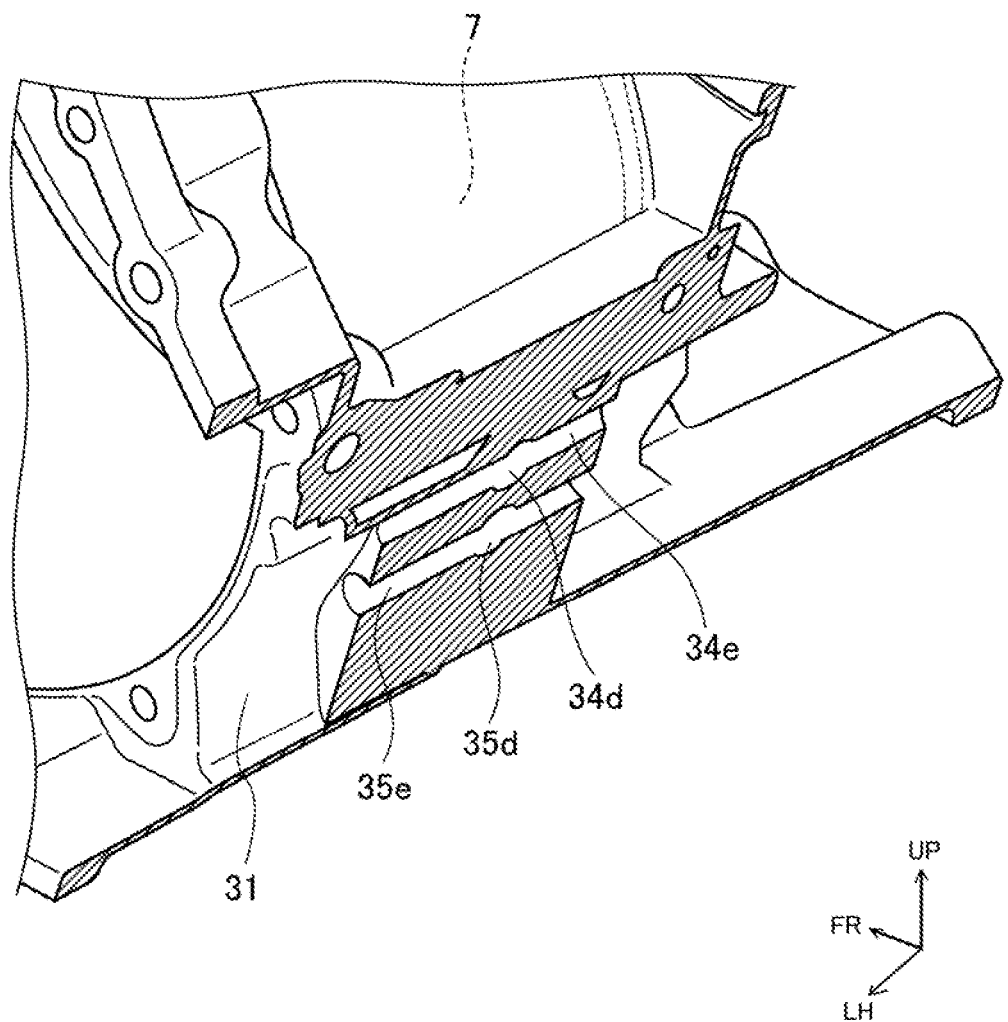
FIG. 5 is a perspective cross-sectional view illustrating an oil passage extending along a cold water jacket.

FIG. 4 is a perspective cross-sectional view illustrating another oil passage structure and FIG. 5 is a perspective cross-sectional view illustrating an oil passage extending along the cold water jacket 7. Note that, in these figures, FR, UP, and LH indicate a frontward direction, an upward direction, and a leftward direction, respectively.

The electric oil pump 4 is mounted to the mounting section 33 provided at a rear portion of the electric motor case 31 and the ports 41, 42 of the electric oil pump 4 are connected to the oil passages 34 and the oil passage 35, respectively, which open in the mounting surface 33a. The oil passage 34 and the oil passage 35 are arranged one above the other in the mounting section 33.

The lubricating oil stored in the lower portions of the electric motor case 31 and the decelerator case 32 is introduced from the oil passage 35 into the electric oil pump 4 and supplied via the oil passage 34 to the oil cooler 6 and into the electric motor case 31 and the decelerator case 32.

The oil passage 34 includes an oil passage 34d and an oil passage 34e while the oil passage 35 includes an oil passage 35d and an oil passage 35e.

The oil passage 34d and the oil passage 35d are oil passages that extend in a direction orthogonal to the mounting surface 33a and toward the cold water jacket 7.

The oil passage 34e and the oil passage 35e extend in the right-left direction along the circumferential surface of the cold water jacket 7.

The oil passage 34d is connected in the vicinity of the cold water jacket 7 to the central portion of the oil passage 34e and the oil passage 35d is likewise connected in the vicinity of the cold water jacket 7 to the central portion of the oil passage 35e.

The oil passage 34 and the oil passage 35 both have an oil passage extended toward the cold water jacket 7 and an oil passage extended along the cold water jacket 7. By virtue of this, the lubricating oil passing through the oil passage 34 and the oil passage 35 is allowed to reside close to the cold water jacket 7, the heat of the lubricating oil is transferred to the cold water jacket 7, and thus the lubricating oil can be efficiently cooled.

In the oil passage 34 and the oil passage 35, the oil passage 34e and the oil passage 35e are arranged one above the other in the vicinity of the cold water jacket 7 and extend in the right-left direction. As a result, the inner space in the mounting section 33 can be effectively utilized and the contact area between the lubricating oil and the electric motor case 31 can be enlarged in the vicinity of the cold water jacket 7.

In addition, since the oil passage includes an oil passage orthogonal to the mounting surface 33a and the oil passage extending in the same direction as the direction in which the output shaft 5 extends, the oil passage 34 and the oil passage 35 can be readily processed and the costs related to the manufacturing thereof can be reduced.

The above-described embodiments only indicate modes of implementation of the present disclosure and can be modified and applied as appropriate within the range where the scope and spirit of the present disclosure are not deviated from.

REFERENCE SIGNS LIST 1 driving device
4 electric oil pump
7 cold water jacket
31 electric motor case
31a cover
31b outer peripheral surface
31c inner peripheral surface
33 mounting section
33a mounting surface
34 oil passage
35 oil passage
37 motor chamber
41 port
42 port
81 connector
81a check valve
82 connector

What is claimed is:

1. A cooling structure of a driving device including an electric motor in an electric motor case,
wherein lubricating oil retained in the electric motor case is made to circulate to lubricate and cool the electric motor,
the electric motor being cooled by cooling water flowing in a cold water jacket provided in the electric motor case in a thickness of the electric motor case,
the cooling structure comprising an oil passage in which the lubricating oil circulates,
the oil passage being provided within the thickness of the electric motor case and on an outer side of the cold water jacket and extending along the cold water jacket,
the electric motor case comprising a mounting section to which an oil pump circulating the lubricating oil is mounted at an outer periphery of the electric motor case,
the oil passage comprises a connector that opens in the mounting section of the electric motor case,
the connector is connected to a port of the oil pump so the lubricating oil passes between the oil passage and the oil pump.

2. The cooling structure of the driving device according to claim 1, wherein the oil passage is provided between the oil pump and the cold water jacket.

3. The cooling structure of the driving device according to claim 2, wherein the oil passage is connected to a discharge side of the oil pump.

* * * * *